United States Patent [19]

Nobumoto et al.

[11] Patent Number: 5,086,889
[45] Date of Patent: Feb. 11, 1992

[54] SLIP CONTROL SYSTEM FOR AUTOMATIC TRANSMISSION WITH LOCK-UP CLUTCH

[75] Inventors: Hidetoshi Nobumoto, Higashi-Hiroshima; Minzi Sakaki, Hiroshima, both of Japan

[73] Assignee: Mazda Motor Corporation, Hiroshima, Japan

[21] Appl. No.: 554,470

[22] Filed: Jul. 19, 1990

[30] Foreign Application Priority Data

Jul. 20, 1989 [JP] Japan .................. 1-190017

[51] Int. Cl.$^5$ .................. F16H 45/02; B60K 41/02
[52] U.S. Cl. .................. 192/0.076; 192/0.096; 192/3.3
[58] Field of Search .................. 192/3.3, 3.31, 0.076, 192/0.096; 74/890; 475/65

[56] References Cited

U.S. PATENT DOCUMENTS

| | | | |
|---|---|---|---|
| 4,468,988 | 9/1984 | Hiramatsu | 74/890 X |
| 4,720,003 | 1/1988 | Murasugi | 192/0.076 |
| 4,724,939 | 2/1988 | Lockhart et al. | 192/3.3 |
| 4,732,245 | 3/1988 | Hiramatsu | 192/3.3 X |
| 4,940,122 | 7/1990 | Fujieda | 192/3.31 |
| 4,953,677 | 9/1990 | Aoki et al. | 192/3.3 |
| 4,957,194 | 9/1990 | Sawa et al. | 192/3.31 X |

FOREIGN PATENT DOCUMENTS

| | | |
|---|---|---|
| 57-33253 | 2/1982 | Japan . |
| 60-65952 | 4/1985 | Japan . |
| 61-88070 | 5/1986 | Japan . |
| 61-119870 | 6/1986 | Japan . |
| 63-26461 | 2/1988 | Japan . |
| 1-288662 | 11/1989 | Japan .................. 192/3.31 |

Primary Examiner—Richard Lorence
Attorney, Agent, or Firm—Fleit, Jacobson, Cohn, Price, Holman & Stern

[57] ABSTRACT

A slip control system for a lock-up clutch of an automatic trnasmission includes a torque converter having an input member, connected to an engine output shaft so that engine output torque is transmitted, and an output member, driven by virtue of a rotation of the input member through a hydraulic fliud. A slip control device controls an engaging force of the lock-up clutch to carry out a slip control so that an amount of slippage in the lock-up clutch is controlled to a target value, corresponding to a target speed difference between the input and output members. An acceleration detecting device detects an accelerating condition of a vehicle, and an engine load detecting device detects an engine load. A slip control changing device suppresses a responsiveness in controlling the slippage in accordance with change in the engine load at the end of the accelerating condition of the vehicle.

5 Claims, 9 Drawing Sheets

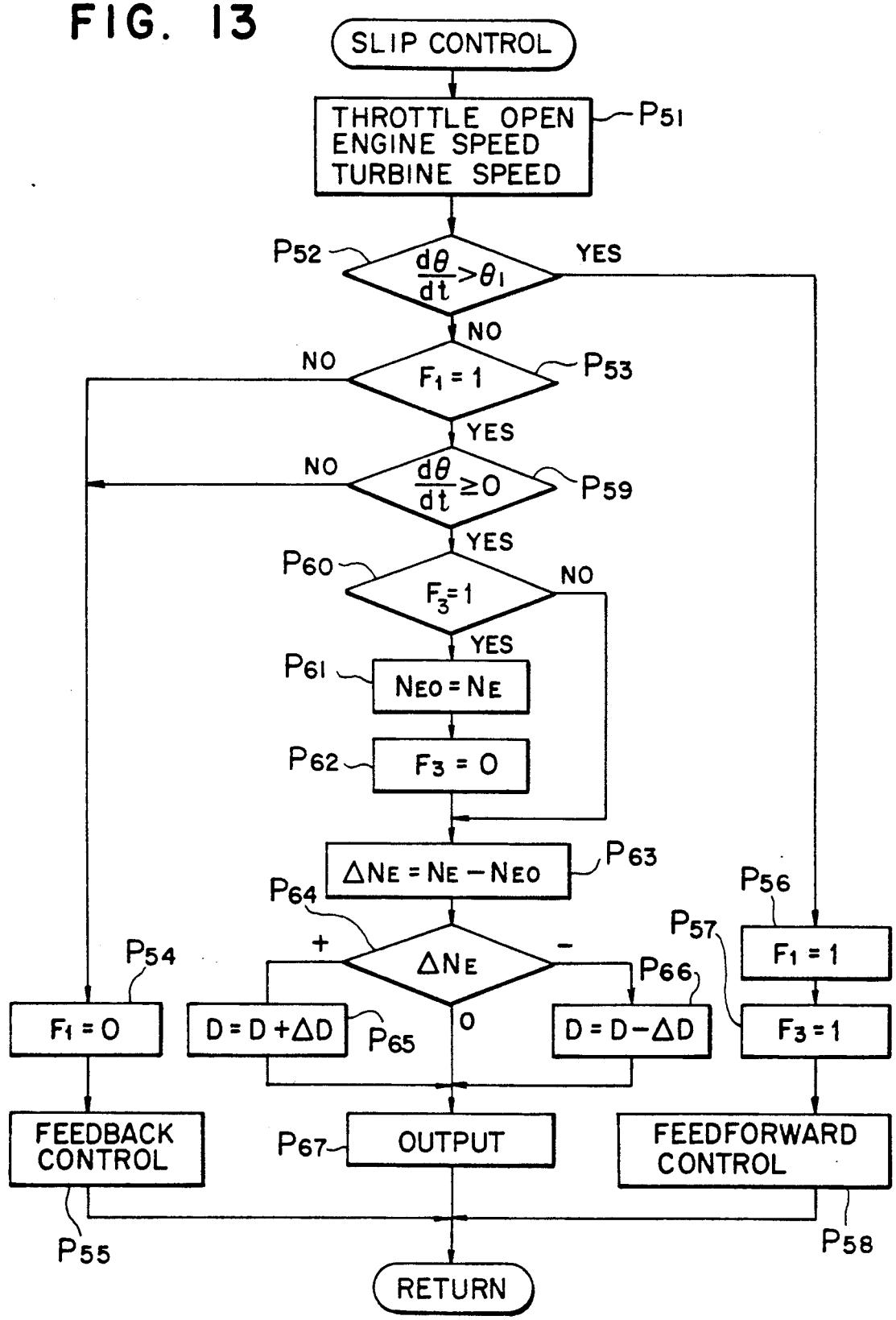

SLIP CONTROL SYSTEM FOR AUTOMATIC TRANSMISSION WITH LOCK-UP CLUTCH

CROSS REFERENCE TO RELATED APPLICATION

The present application relates to co-pending U.S. Pat. application Ser. No. 293,689 filed on Jan. 5, 1989, now U.S. Pat. No. 4,953,679 which is assigned to the same assignee as the present application.

BACKGROUND OF THE INVENTION

1. Field of the Invention

This invention relates to a slip control system for a lock-up clutch in a torque converter of an automatic transmission of a vehicle.

2. Description of the Related Art

There has been known an automotive vehicle equipped with a lock-up clutch for establishing a direct engagement of an input member and output member of a torque converter. The lock-up clutch is actuated to be fully engaged (lock-up condition) under a specific operating condition, in which it is not necessary to amplify the engine torque or to reduce the torque shock due to shift operations in the automatic transmission, so as to increase torque transmitting efficiency of the torque converter, resulting in an improved fuel consumption efficiency. It should, however, be noted that the lock-up clutch, when engaged, produces a problem that an engine vibration and noise are increased, because an engine output shaft is mechanically joined with a transmission gear mechanism.

In view of this, Japanese Patent Public Disclosure 57-33253, laid open to the public in 1982, discloses a transmission control system in which the lock-up clutch is controlled to produce a certain amount of slippage between the input member and the output member of the torque converter so that the engine vibration transmitted to the vehicle body from the transmission is reduced, with the lock-up clutch transmitting a certain amount of engine torque therethrough. In the common slip control, the rotation speeds of the input and output members are detected so that and engaging force of the lock-up clutch is controlled in a manner such that a relative speed or slippage therebetween is converged to a predetermined target value by means of a feedback control (slip condition).

Further, in this type of the slip control system, when an acceleration of the vehicle is needed, even under such operating ranges that fully engaging or slip conditions of the lock-up clutch are to be established, the lock-up clutch is fully released to establish a converter condition (hereinafter referred to as a converter release control). The converter release control is carried out in terms of a feedforward control so that torque amplification effect can be obtained in such an accelerating condition of the vehicle to improve acceleration performance.

It should, however, be noted that there occurs a problem when the converter release control is terminated in response to the termination of the accelerating condition of the vehicle to resume a control to the lock-up condition or slip condition.

The problem is caused in that when the engaging force of the lock-up clutch is abruptly increased in controlling the slippage between the input and output members to the target slippage, the engine speed is undesirably decreased due to a abrupt increase of load acting on the engine output shaft.

In this connection, there is a situation where throttle opening is not returned to a full closed position even when the accelerating condition of the vehicle is substantially terminated. For instance, the driver operates the acceleration pedal to get a slight accelerating condition from an abrupt accelerating condition. In this case, the throttle opening is slightly increased, although the converter release control is terminated. This is because the converter release control is performed only when the throttle valve is opened beyond a predetermined value. As a result, the driver cannot obtain a good feeling in some cases, while driving the vehicle, due to the unexpected engine speed depression.

In order to avoid this problem, it has been suggested that the control to the slip or lock-up condition from the converter release control should not be initiated until a change of the throttle opening is zero or a negative value. However, this suggestion is disadvantageous in that the converter condition is unduly maintained, even where the torque amplification is not needed under the condition. This deteriorates the fuel consumption efficiency.

SUMMARY OF THE INVENTION

It is, therefore, a primary object of the invention to prevent the driver of the vehicle from an unexpected feeling at the end of accelerating condition.

Another object of the invention is to provide a slip control system which can prevent undue continuation of converter condition at the end of the accelerating condition.

Still another object of the invention is provide a slip control system for an automatic transmission with a lock-up clutch for smoothly transferring from the converter condition to the slip or lock-up condition.

The above object of the invention can be accomplished by providing a portion slip control system for a lock-up clutch of an automatic transmission comprising a torque converter having an input member connected to an engine output shaft so that engine output torque is transmitted, and an output member driven by rotation of the input member through a hydraulic fluid slip control means are provided for controlling an engaging force of the lock up clutch to carry out a slip control so that an amount of slippage in the lock-up clutch is controlled to a target value corresponding to a target speed difference between the input and output members, acceleration detecting means for detecting an accelerating condition of a vehicle, and engine load detecting means detect an engine load. Finally, slip control changing means are provided for suppressing a responsiveness in controlling the slippage in accordance with change in the engine load at the end of the accelerating condition of the vehicle.

Preferably, a control gain for the slip control is changed for a predetermined period after the accelerating condition of the vehicle.

Further, the control gain is decreased as a change rate in the engine load at the end of the accelerating condition is increased.

In another aspect of the invention, the slip control changing means may suppress the responsiveness of the slip control as an increment of the engine load is increased at the end of the accelerating condition.

The engine load can be obtained by detecting for example a throttle opening of the throttle valve.

In accordance with another preferred embodiment of the present invention, the slip control changing means delays a transfer to a control by the slip control means as an increment of the engine load is increased.

In still another preferred embodiment of the present invention, the slip control changing means causes the slip control means to prevent the engine speed from reducing when the engine load is being increased at the end of the accelerating condition of the vehicle.

According to the above features of the present invention, a sufficient acceleration can be obtained under an accelerating condition by establishing the converter condition in which the engine torque is amplified in the torque converter. At the end of the accelerating condition of the vehicle, the slip control is changed in accordance with the change in the engine load to provide an optimized control property for the engaging force of the lock up clutch.

For example, even when an accelerating condition providing a throttle opening greater than a critical value for initiating the converter release control is terminated, the lock-up clutch is controlled so that the torque converter is maintained so as to exert the torque amplificating function as far as the throttle opening is increased. In order to suppress the responsiveness of the slip control, control gain in the slip control may be reduced when the control is made in terms of the feedback control. Alternatively, a renewing cycle or output cycle of the control signal for the engaging force may be set at a longer one in the slip control.

The above and other features of the present invention will be apparent from the following detailed description of the preferred embodiment of the present invention making reference to with the accompanying drawings.

BRIEF DESCRIPTION OF THE DRAWINGS

FIG. 13 is a flowchart of a control in accordance with still another embodiment of the present invention.

DESCRIPTION OF THE PREFERRED EMBODIMENTS

Figure 1:
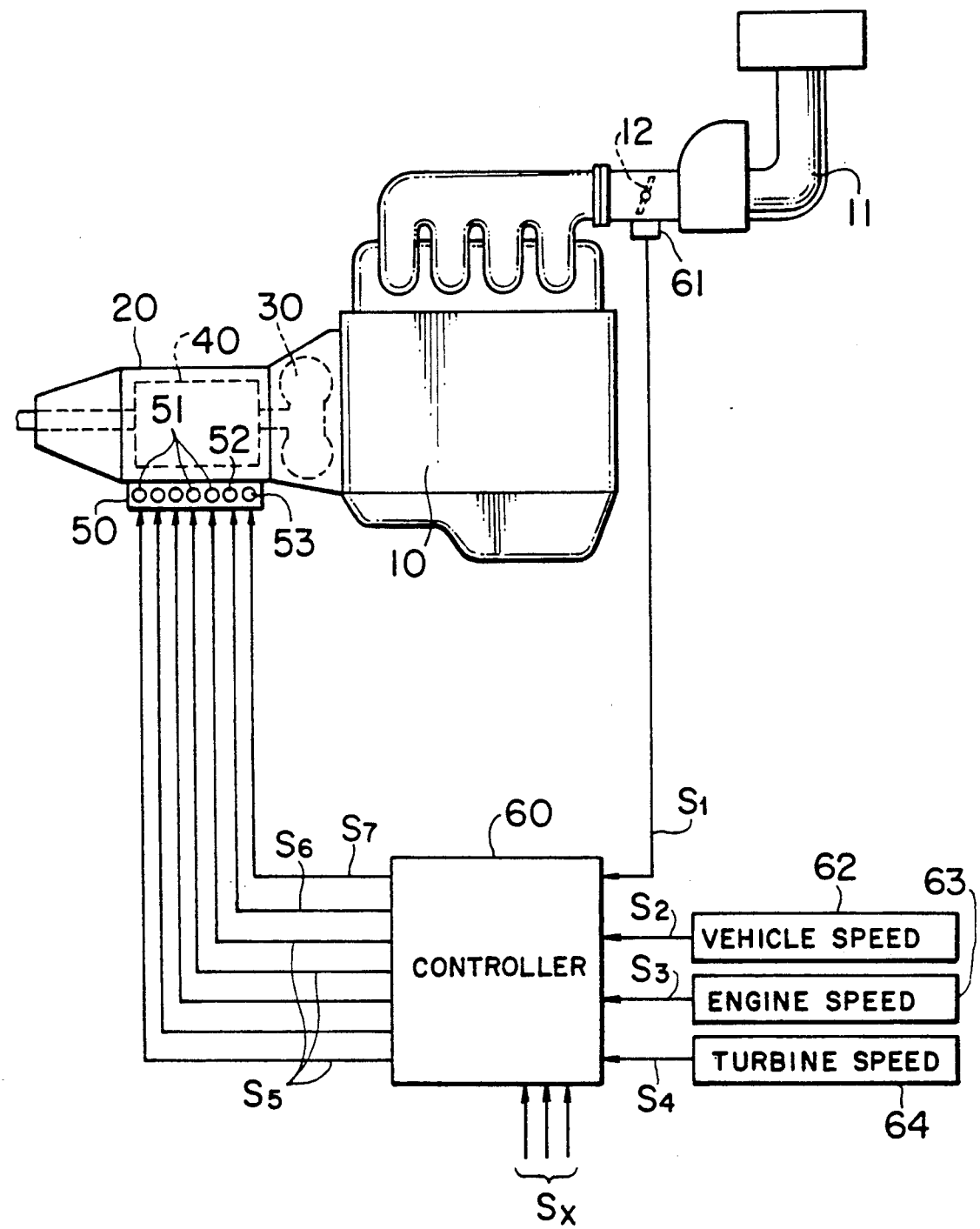
FIG. 1 is a schematic view of a control system for an automatic transmission.

Referring to FIG. 1, there is illustrated a power plant and a control system of a vehicle to which the present invention can be applied.

The power plant is provided with an engine 10 and an automatic transmission. The engine 10 includes an intake system 11 for introducing an intake gas to a combustion chamber and an exhaust system (not shown) for scavenging an exhaust gas from the combustion chamber. The intake system 11 includes a throttle valve 12 for controlling an amount of the intake gas.

The automatic transmission 20 is provided with a torque converter 30 connected with an output shaft of the engine 10, a multiple transmission gear mechanism 40 connected with output shaft of the torque converter 30 for establishing a shift gear stage having a predetermined speed ratio among a plurality of shift gear stages by switching a power transmitting path, and a hydraulic control unit 50 for selectively actuating a plurality of frictional elements therein by switching the power transmitting path to establish a predetermined shift gear stage.

Figure 2:
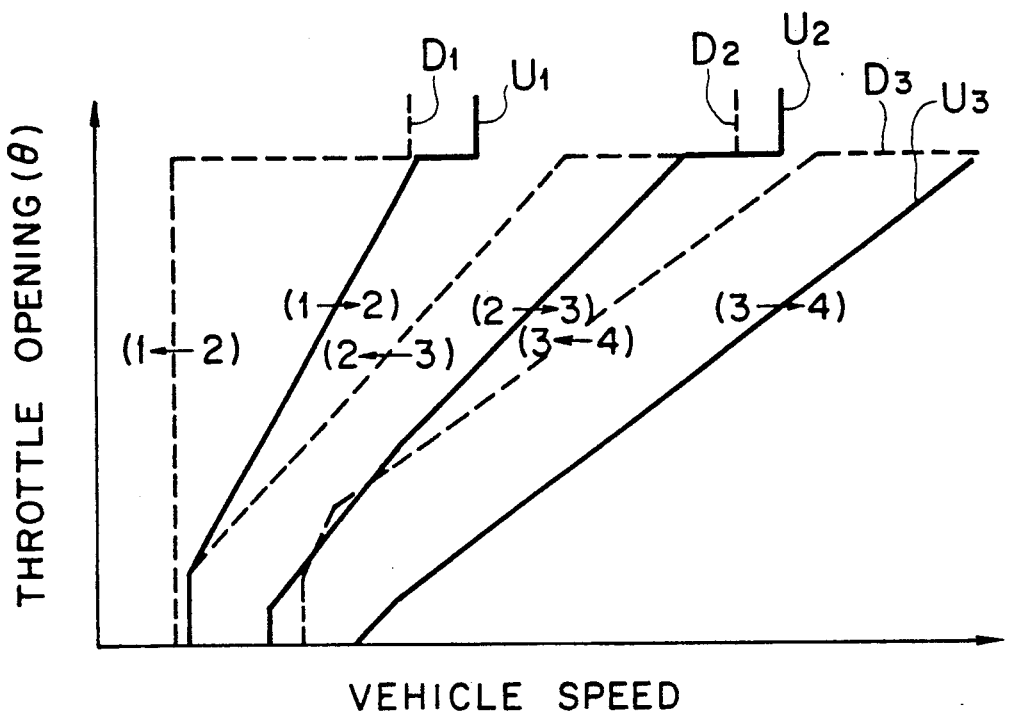
FIGS. 2 and 3 are graphical representations showing a relationship between the throttle opening and vehicle speed which is employed in a lock-up control.
Figure 3:
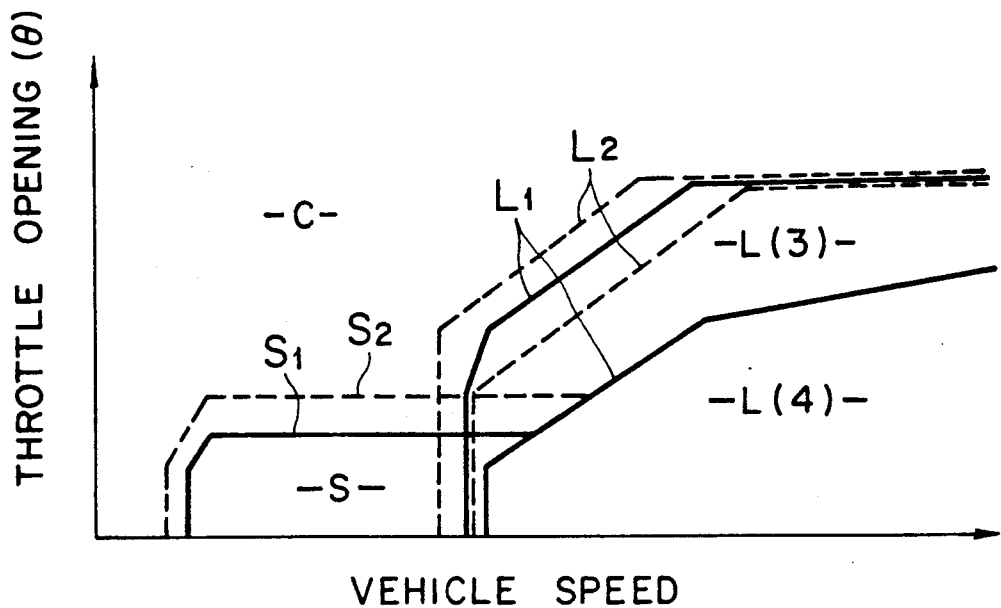
Figure 4:
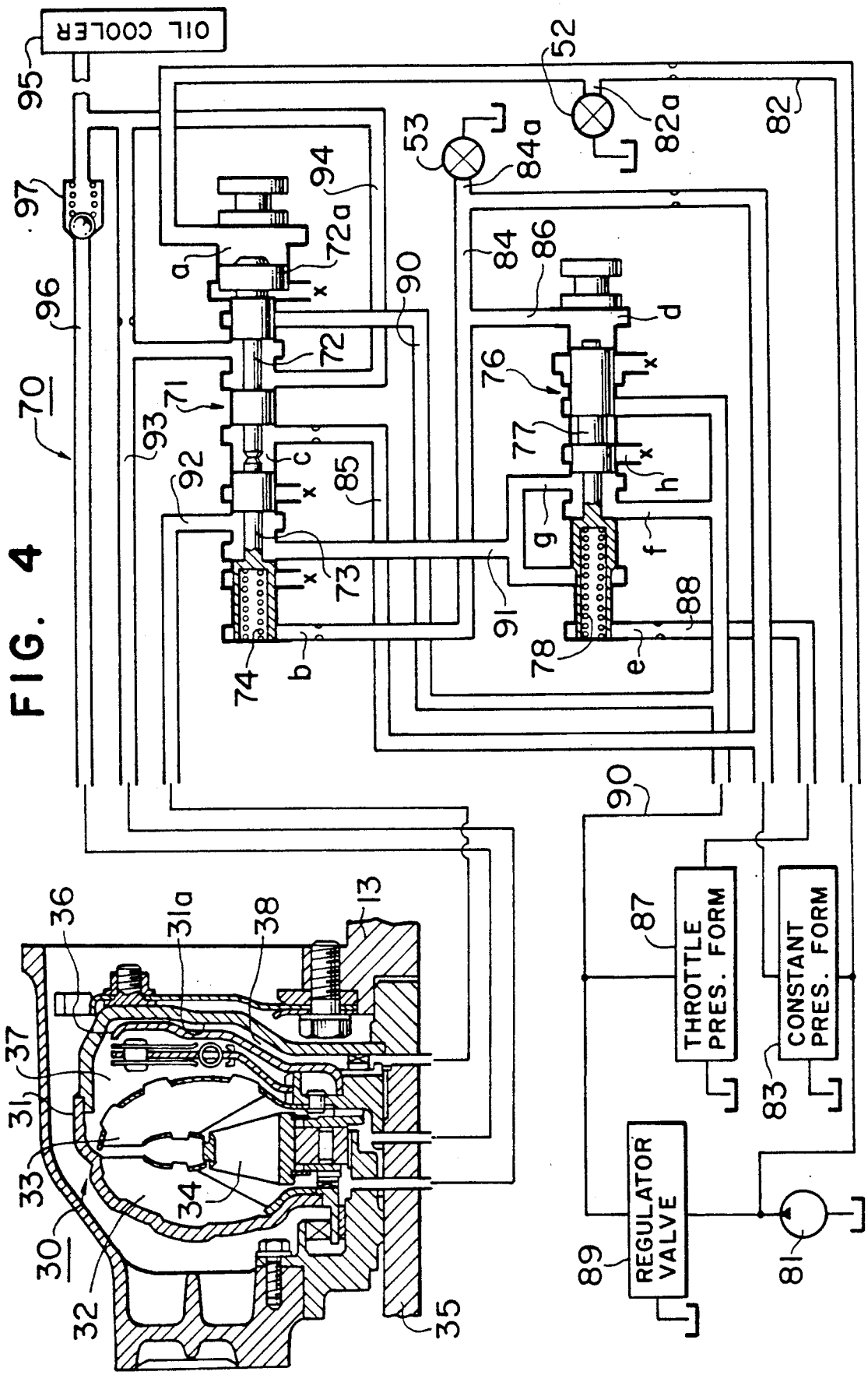
FIG. 4 is a sectional view showing a torque converter and a hydraulic control circuit therefore.

Referring further to FIGS. 2, 3 and 4, and specifically to FIG. 4, the torque converter 30 is provided with a pump 32 rotatably disposed in a casing 31, a turbine 33 rotatably disposed facing the pump 32 in the casing and a stator 34 disposed between the pump 32 and the turbine 33. The casing 31 is connected with an engine output shaft 13 so that the casing 31 and the pump 32 are integrally rotated with the engine output shaft 13. The rotation of the pump 32 causes rotation of the turbine 33 by way of a hydraulic fluid in the casing 31. In this case, when the rotation ratio of the turbine 33 to the pump 32 is smaller than a predetermined value, engine torque from the pump 32 is amplified to be transmitted to the turbine by virtue of the stator 34. The rotation of the turbine 33 is transmitted to the transmission gear mechanism 40 through a turbine shaft 35.

The torque converter 30 is further provided with a lock-up clutch 36 disposed facing an inner surface 31a of the casing 31 behind the turbine 33. The lock-up clutch 36 is urged toward the casing 31 to be engaged with the inner surface 31a by virtue of a hydraulic pressure in an engaging chamber 37. When engaged, the lock-up clutch 36 connects the pump 32 with the turbine 33 so that the engine output shaft 13 is mechanically connected with the turbine shaft 35 to establish a lock-up condition of the torque converter 30 in which the slippage in the lock-up clutch is not allowed.

When the hydraulic pressure is introduced into a releasing chamber 38, the lock-up clutch 36 is disengaged from the inner surface 31a to be rotated through the hydraulic fluid for establishing the converter condition in which the engine torque is amplified therein. When the hydraulic pressure is adjusted to be slightly decreased for reducing the engaging force against the inner surface from the lock-up condition, the lock-up clutch 36 produces slippage with regard to the inner surface 31a to establish the slip condition of the torque converter 36 in which the turbine 33 rotates with a predetermined slippage relative to the pump 32 in accordance with the hydraulic pressure introduced into the chamber 38.

The control unit 50 is provided with five solenoid valves 51 for making the shift operation of the transmission gear mechanism 40, a first and second solenoid valves 52 and 53 for making the lock-up clutch control. A controller 60 is provided for controlling the solenoid valves 51, 52 and 53.

The controller 60 receives a signal $S_1$ from a throttle opening sensor 61 for detecting opening of the throttle valve 12, signal $S_2$ from a vehicle speed sensor 62 for detecting vehicle speed, a signal $S_3$ from an engine speed sensor 63 for detecting engine rotation speed, a signal $S_4$ from a turbine speed sensor 64 for detecting turbine rotation speed, and other signals $S_x$ necessary for the control. The controller produces shift signals $S_5$ to the solenoids 51 and lock-up control signals $S_6$ and $S_7$ to the solenoids 52 and 53. The controller 60 controls switching the power transmitting path of the transmission gear mechanism 40 to perform the shift operation and controls the torque converter in a manner such that a slip rate of the lock-up clutch is controlled to a desirable value between the converter condition and the lock-up condition across the slip condition.

In performing the shift control and the lock-up control, the controller 60 is provided with a shift pattern map providing a relationship between the vehicle speed and the throttle opening as shown in FIG. 2. The controller 60 compares an actual vehicle operating condition obtained through the sensors 61 and 62 of FIG. 1 with the shift pattern in the map of FIG. 2. The controller 60 produces the signals $S_5$ to cause the solenoid valves to make a shift up operation when the actual vehicle operating condition changes across shift up lines $U_1$ through $U_3$ while increasing the vehicle speed and a shift down operation when the actual vehicle operating condition changes across shift down lines $D_1$ through $D_3$ while decreasing the vehicle speed. The controller 60 is provided with a lock-up control pattern defined by the vehicle speed and the throttle opening as shown in FIG. 3. The controller 60 compares the actual operating condition with the lock up control pattern. The controller 60 produces the control signal $S_6$ to the first solenoid valve 52 to establish the lock-up condition or the slip condition when the operating condition is in a zone L or S on the map of FIG. 3 while establishing the converter condition when in a zone C of the converter condition other than the zones L and S. In the slip zone S, the controller 60 produces the control signal $S_7$ to the second solenoid valve 53 for adjusting the engaging force of the lock-up clutch 4 to produce a predetermined slippage therein in which the pump 32 is allowed to make a rotation relative to the turbine 33. The lock-up zone is provided with regard to third and fourth stages wherein lock-up and slip establishing lines $L_1$ and $S_1$, and lock up and slip releasing lines $L_2$ and $S_2$ are provided respectively corresponding to the shift up and shift down lines U and D.

As clearly shown in FIG. 4, there is provided a hydraulic circuit 70 for performing the lock-up control. The circuit 70 is provided with a lock-up shift valve 71 for switching the conditions of the lock-up clutch 4 and a regulating valve 76 for controlling the hydraulic pressure introduced into the releasing chamber 38 in the slip condition. The valves 71 and 76 are controlled in accordance with operations of the first and second solenoid valves 52 and 53.

The shift valve 71 is provided with a first spool 72 located at a right portion, a second spool 73 located at a left portion and a spring 74 disposed at a left end portion for urging the second spool 73 rightward. The first spool 72 is formed with an enlarged pressure land 72a at right end thereof. The shift valve 71 is also formed with a first control port a at a right end of thereof and a second control port b at a left end and a third control port c at an intermediate portion where the first and second spool 72 and 73 face each other. To the first port a is connected a first control line 82 directly introducing the hydraulic pressure from a delivery of an oil pump 81. To the second port b is connected a second control line 84 which introduces the hydraulic pressure from the oil pump 81 through a constant pressure forming section 83. To the third port c is connected a third control line 85 which is separated from an upstream portion of the second control line 84. The first and second control lines 82 and 84 are provided with drain ports 82a and 84a respectively. On the drain ports 82a and 84a are disposed the first and second solenoid valves 52 and 53 as aforementioned.

The solenoid valve 52 opens and closes the drain Port 82a in accordance with the signal $S_6$ from the controller 60 wherein the port a is closed when the first solenoid valve 52 is turned off. The second solenoid valve 53 is a duty solenoid which repeats on off operation quickly in accordance with a duty ratio (on-off ratio in a single cycle) so that the hydraulic pressure in the second control line 84 is reduced as the duty ratio is increased.

The regulating valve 76 is provided with a spool 77 and a spring 78 disposed at a left side of the spool 77 to urge the spool 77 rightward. The regulating valve 76 is formed at a right end portion with a first control port d to which a line 86 separated from the line 84 is connected, and at a left end with a second control port e to which a throttle pressure line 88 communicated with a throttle pressure forming section 87. The throttle pressure forming section 87 is connected with a main line 90 which is communicated with a regulator valve 89 for adjusting a delivery pressure of the pump 81 to a predetermined line pressure. The throttle pressure forming section 87 adjusts the line pressure to a throttle pressure corresponding to the throttle opening.

The regulating valve 76 is provided at an intermediate portion thereof with an input port f connected with the main line 90 and an output port g connected with a communication line 91 which is connected with the shift valve 71 and a drain port h forming a hydraulic control section. Into the first and second port d and e of the regulating valve 76 are introduced the hydraulic pressure in the lines 84 and 86 respectively adjusted in accordance with the duty ratio for the second solenoid valve 53 so that the spool 77 is displaced in accordance with a balance among the pressure to the first and second ports d and e and resilient force by the spring 78. As the spool is displaced rightward from a position shown in FIG. 4, in other words as the hydraulic pressure in the first control port d is reduced, the line pressure introduced into the input port f is reduced and supplied to the shift valve 71 by way of the output port g.

In the lock-up control, when the first solenoid valve 52 is kept off and the duty ratio of the second solenoid valve 53 is zero, the drain ports 82a and 84a of the first and second lines are closed so that the controlled hydraulic pressure is introduced into the first and second ports a and b of the shift valve 71 and the first control port d of the regulating valve 76. In the shift valve, the hydraulic pressure in the first port a acting on the enlarged land 72a of the spool 72 overcomes a sum of the hydraulic pressure in the second control port b and the resilient force of the spring 74 so that the first and second spools 72 and 73 are displaced to the left side of the valve 76 as shown in FIG. 4. As a result, a releasing line 92 communicated with the lock-up releasing chamber 38 in the torque converter 30 is communicated with the communication line 91 which is connected with the regulating valve 76 while an engaging line 93 connected with the engaging chamber 37 of the torque converter 30 is connected with an oil cooler 95 through a line 94 for draining. In the regulating valve 76, a high hydraulic pressure is introduced into the first control port d causing the spool 77 of the valve 76 to be displaced at the leftmost position as shown in FIG. 4 so that the line pressure from the main line 90 is introduced from the inlet port f to the outlet port g. This line pressure is introduced via the releasing line 92 into the releasing chamber 38 of the torque converter 30 as a releasing pressure through the communication line 91 and the shift valve 71 so that the lock-up clutch 36 is disengaged to establish the converter condition of the torque converter 30.

When the first solenoid valve 52 is turned on to open the drain port 82a of the first control line 82 and the duty radio of the second solenoid valve 53 takes a value of zero to close the drain port 84a of the second control line 84, the first and second spools 72 and 73 of the shift valve 71 are moved rightward due to the hydraulic pressure introduced in the second control port b and the resilient force of the spring 74. In this case, the engaging line 93 is communicated with the main line 90 and the releasing line 92 is communicated with the drain port of the shift valve 71 so that the lock-up clutch 36 is engaged to establish the lock-up condition.

When the first solenoid valve is turned on to open the drain port 82a of the first control line 82 and the duty ration of the second solenoid valve 53 takes a valve greater than a predetermined value such as 20%, and when the control pressure in the line 84 is reduced below a predetermine value, the hydraulic pressure introduced into the third control port c from the control line 85 overcomes a sum of the forces due to the hydraulic pressure in the second port b and the spring 74 in the shift valve 71 so that the second spool 73 is placed at the leftward position while the first spool 72 is placed at the rightward position due to the hydraulic pressure in the third port c.

In this case, the main line 90 is communicated with the engaging line 93 and the regulating valve 76 is communicated with the releasing line 92 so that the line pressure is introduced into the engaging chamber 37 of the torque converter 30 and concurrently the releasing pressure adjusted in accordance with the duty ratio of the second solenoid valve 53 is introduced into the releasing chamber 38. As a result, the engaging force of the lock-up clutch 36 is reduced by the releasing pressure introduced into the releasing chamber 38 compared with the lock-up condition to produce a slippage with establishing the slip condition of the torque converter 30. The amount of the slippage of the lock-up clutch 36 of the torque converter 30 is reduced as the duty ratio is increased since the releasing pressure for the lock-up clutch 36 is reduced as the duty ratio of the second solenoid valve 53 changes.

There is provided a line 96 for introducing the hydraulic fluid heated in the torque converter 30 through a pressure holding valve 97. In operation, the system follows a flow chart of a slip control, performed by the controller 60, shown in FIG. 5.

Figure 5:
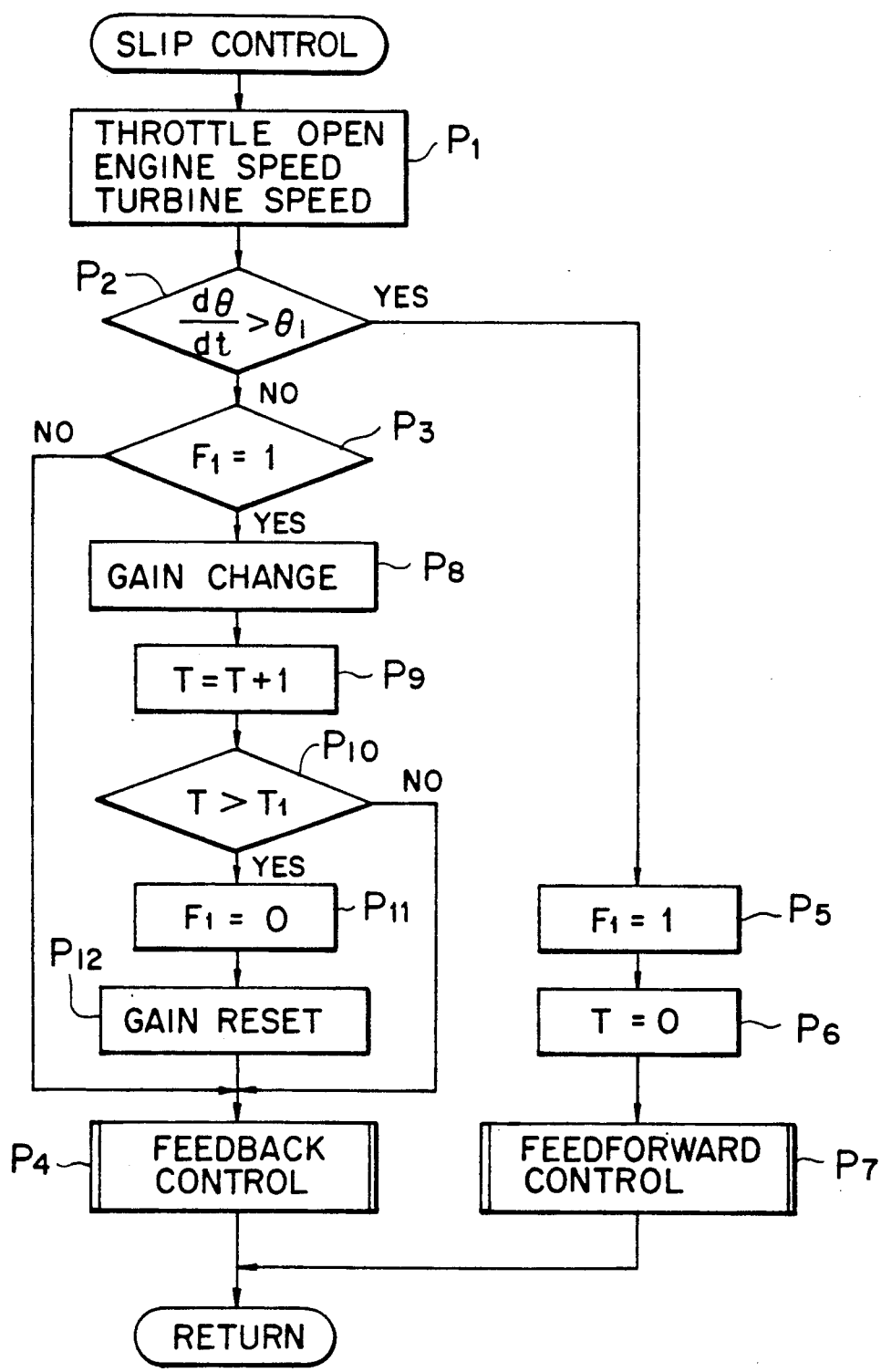
FIG. 5 is a flowchart showing a control in accordance with a preferred embodiment the present invention.

In FIG. 5, the controller 60 detects the throttle opening, engine speed and turbine speed based on the signals $S_1$, $S_3$, $S_4$ from the sensors 61, 62 and 63 in step P1. In step P2, it is judged whether or not a change rate $(d\Theta/dt)$ of the throttle opening $\Theta$ is greater than a predetermined value $\Theta_1$. When the change rate $(d\Theta/dt)$ is not greater than the predetermined value $\Theta_1$, in other words, when there is no request for an abrupt acceleration, the controller 60 judges a value of a flag F1 in step P3. The flag F1 takes a value of zero in normal operating condition of the vehicle. Thus, when the flag F1 is zero, the controller 60 goes to step P4 to execute feedback control of the slippage to accomplish a predetermined target value.

Figure 6:
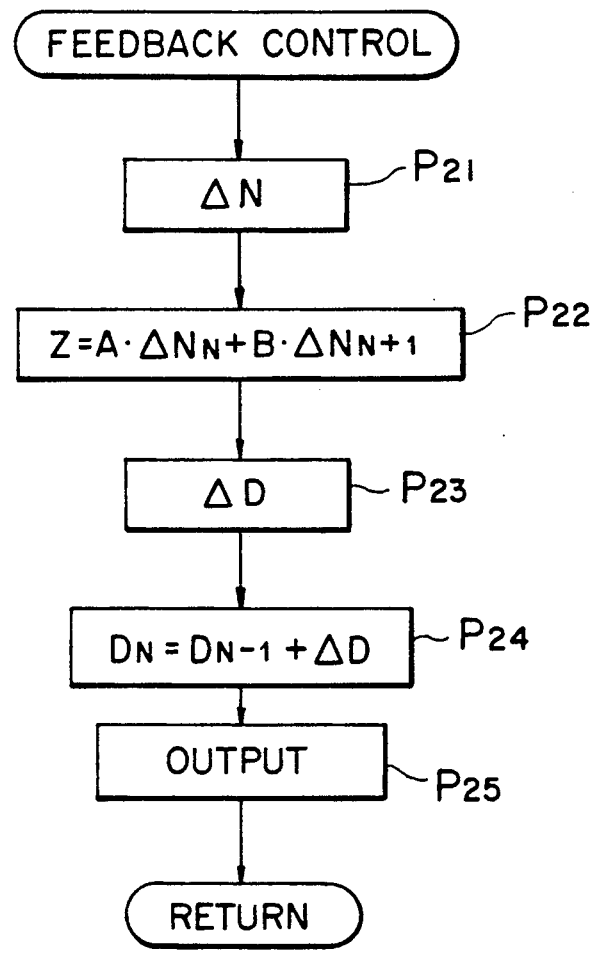
FIG. 6 is a flowchart employed in the control of FIG. 5.

The feedback control of the slippage of the lock-up control is carried out in accordance with proceedings as shown in FIG. 6 in the form of flow chart.

In FIG. 6, the controller 60 calculates a difference $\Delta N$ from the target slippage of the torque converter based on the engine speed and the turbine speed obtained through the signals $S_3$ and $S_4$ of the sensors 63 and 64 in step P21. In step P22, the controller 60 calculates a modification coefficient Z based on the difference $\Delta N_N$ in the current processing cycle and the difference $\Delta N_{N-1}$ in the preceding processing cycle in accordance with the following equation:

$$Z = A \cdot \Delta N_N + B \cdot \Delta N_{N-1}$$

Figure 7:
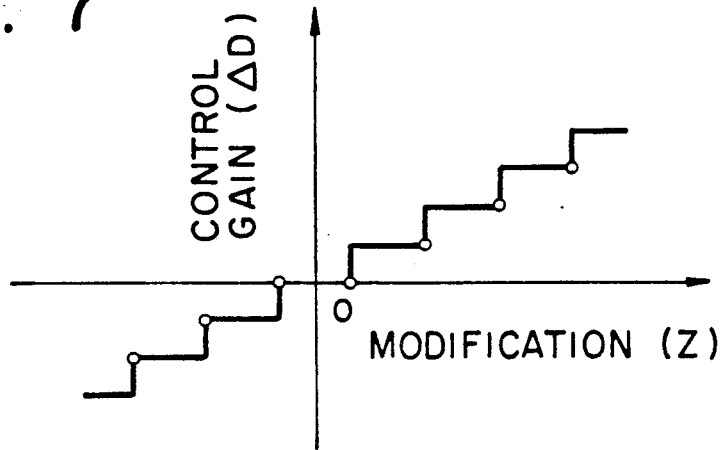
FIG. 7 is a graphical representation providing a feedback compensation employed in the control.

The controller 60 obtains a compensating value $\Delta D$ for the duty ratio based on the modification coefficient Z in light of a map as shown in FIG. 7 in step P23. The controller 60 calculates the duty ratio $D_N$ in the current cycle by adding the compensating value $\Delta D$ to the duty ratio $D_{N-1}$ in the preceding cycle in step P24. The controller 60 provides the second solenoid valve 53 with the control signal $S_7$ for actuating it in step P25. When the slippage obtained the above proceedings is greater than the target value, the duty ratio D is increased to reduce the releasing pressure of the lock-up clutch 36 which is adjusted by the regulating valve 76 in FIG. 4 so that the engaging force of the lock-up clutch 36 is increased to reduce the slippage. Conversely, when the slippage is smaller than the target value, the duty ratio D is decreased to increase the releasing pressure for increasing the slippage so that the slippage is controlled to the target value.

Figure 9:
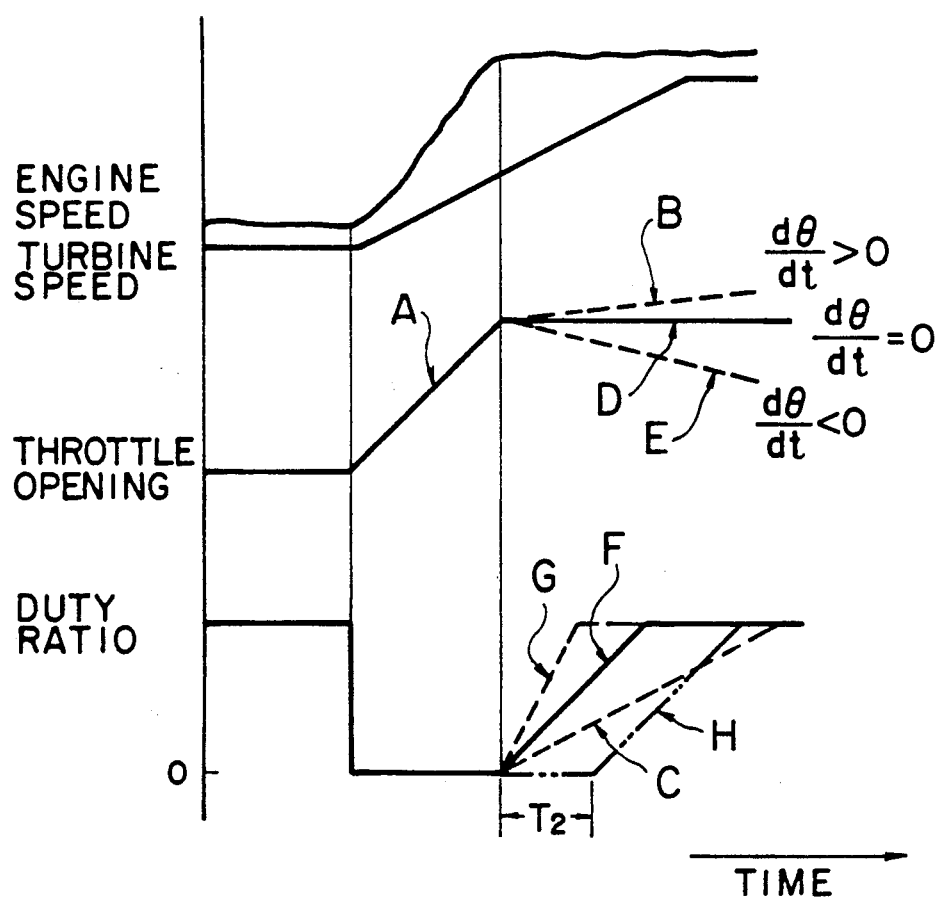
FIG. 9 is a graphical representation showing time change property of variables.

When the driver wants an abrupt acceleration to increase the change rate $(d\Theta/dt)$ of the throttle opening beyond the predetermined value $\Theta_1$ as shown by a line A in FIG. 9, the controller 60 executes the step P2, steps P5 through P7, in which the flag F1 is set at a value 1 of and a timer count value T is cleared, thereafter carries out a feedforward control for the slippage.

In this feedforward control, the duty ratio of the second solenoid valve 53 is fixed to the value of zero. Thus, the hydraulic control pressure introduced into the first port d of the regulating valve 76 or the releasing pressure adjusted therein is maximized to release the lock up clutch 36 entirely. Consequently, when a greater acceleration is required even under the slip condition, the torque converter 30 is controlled to establish the converter condition for obtaining the torque amplification effect, resulting in a greater acceleration of the vehicle.

Figure 8:
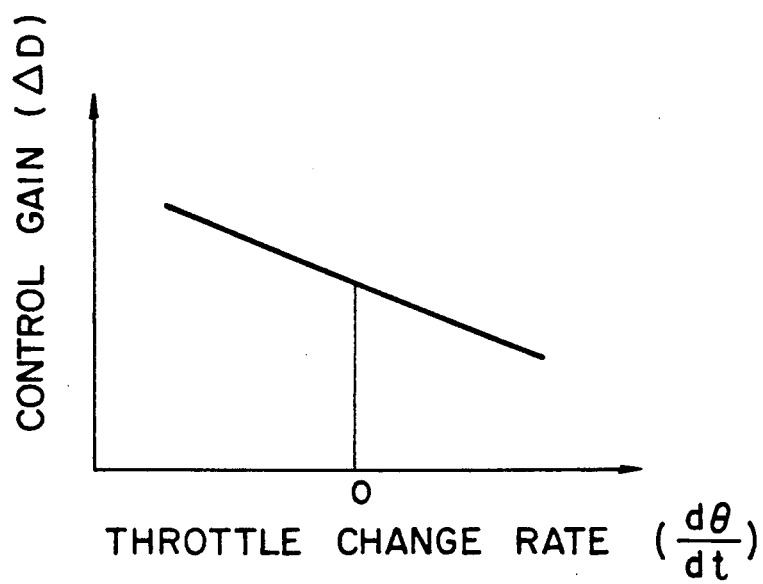
FIG. 8 is a graphical representation providing a control gain in relation to change rate in throttle opening.

When the requirement for the abrupt acceleration is released to reduce the change rate $(d\Theta/dt)$ of the throttle opening $\Theta$ below the predetermined value $\Theta_1$, the controller 60 executes the feedback control again in step P4. In this case, the flag F1 is set at the value 1 in step P5, since this feedback control is carried out after a control for the abrupt acceleration of the vehicle. Thus, the controller 60 executes step P2, and P3 through P8 to change the compensating value or the control gain $\Delta D$ in step P23 in FIG. 6. The control gain $\Delta D$ is determined in accordance with the change rate $(d\Theta/dt)$ of the throttle opening $\Theta$, wherein the control gain $\Delta D$ is reduced as the change rate $(d\Theta/dt)$ is increased in light of a map as shown in FIG. 8. In step P9, the controller 60 increases the timer count value T by 1 and judges in step P10 whether or not the timer count value T exceeds a predetermined value $T_1$. In short, the controller 60 executes the feedback control of the step P4 with the control gain $\Delta D$ obtained through the map of FIG. 8 for the time period $T_1$. In other words, the control gain $\Delta D$ depends on the change rate $(d\Theta/dt)$ at the time of termination of the abrupt acceleration. For example, where the change rate $(d\Theta/dt)$ takes a positive value as shown by a line B in FIG. 9, namely, when the driver wants a slight acceleration after the abrupt acceleration, the duty ratio D is gradually increased from the value zero as shown by a line C in FIG. 9 to a value enough to accomplish the target slippage. According to the control, the torque converter 30 is maintained at a condition close to the converter condition so that the engine speed is prevented from being reduced with amplifying the torque transmitted through the torque converter 30. Thus, a slightly accelerating condition is obtained to meet the driver's request. On the other hand, as shown in lines D and E, when the change rate $(d\Theta/dt)$ takes a value of zero or negative one, the duty ratio D is increased quickly to leave the converter condition promptly as shown by lines F and G in FIG. 9 for thereby improving the fuel consumption efficiency.

Figure 10:
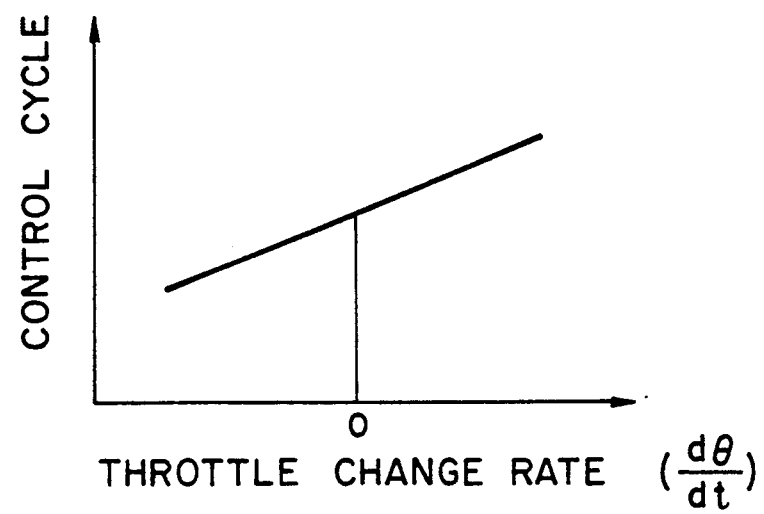
FIG. 10 is a graphical representation showing a relationship between a control cycle and the change rate in the throttle opening.

When the predetermined time $T_1$ is passed after the termination of the abrupt acceleration, the controller 60 executes steps P11 and P12 to reset the flag F1 and the control gain $\Delta D$ for transferring the control to the normal slip control. In the above embodiment, in transferring the feedforward control at the end of the abrupt acceleration of the vehicle to the feedback control, the control gain $\Delta D$ is reduced as the change rate $(d\Theta/dt)$ is increased so that responsiveness of the feedback control is lowered when the driver wants a slight acceleration after the abrupt acceleration of the vehicle. Alternatively, the responsiveness can be lowered by increasing control cycle for the feedback control in the same situation. For this end, the controller 60 reads the control cycle from a map as shown in FIG. 10 corresponding to the change rate $(d\Theta/dt)$ of the throttle opening $\Theta$ instead of the step P8 in the former example. The controller 60 executes the feedback control in step 4 of FIG. 5 or the control of FIG. 6 in accordance with the control cycle read in the step P8. When the control cycle is increased to increase a cycle for renewing the duty ratio D or for producing the signal $S_7$, the responsiveness of the feedback control is suppressed. Thus, the requested slight acceleration can be accomplished after the abrupt acceleration.

Figure 11:
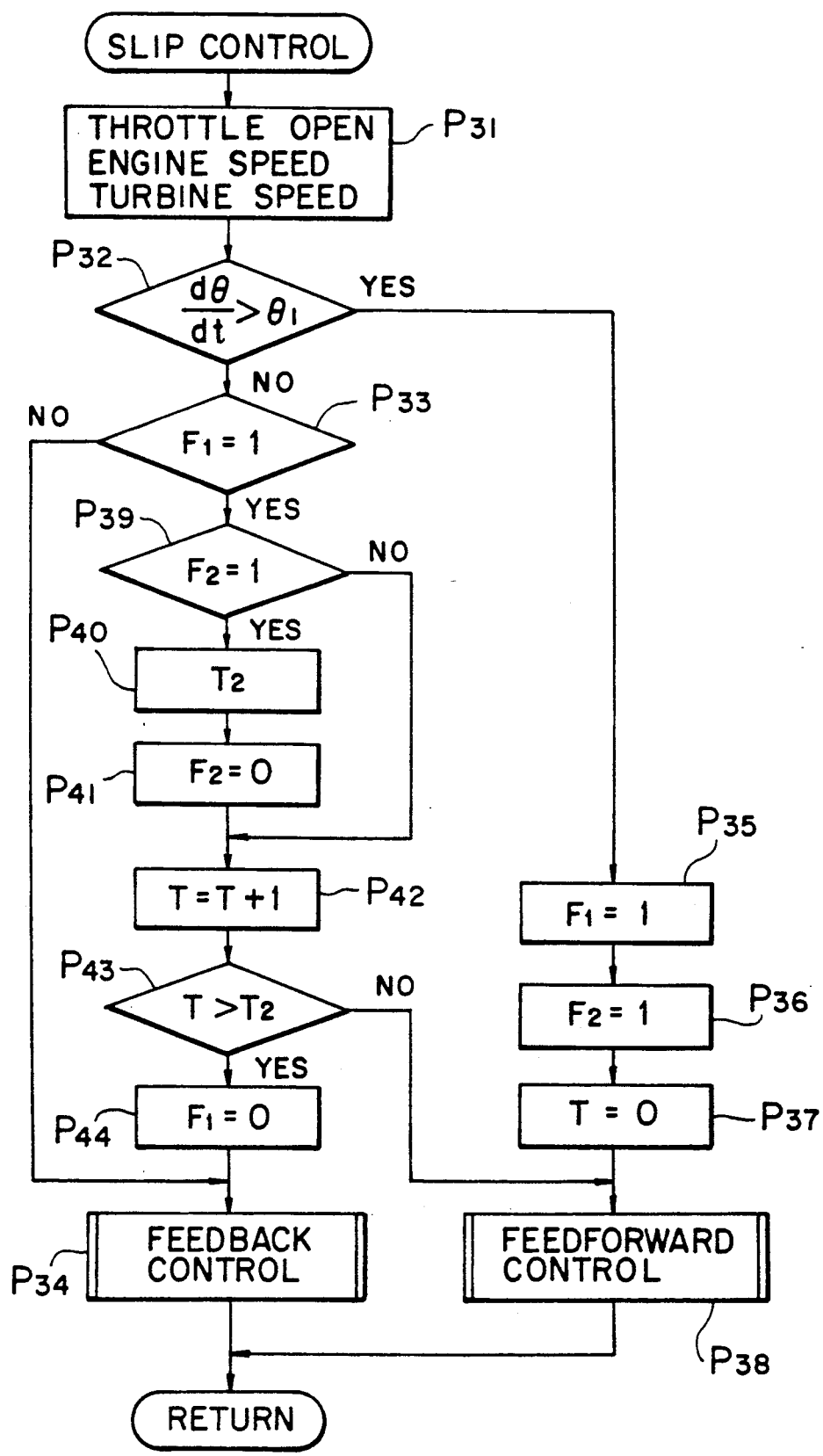
FIG. 11 is a flow chart of a control in accordance with another embodiment of the present invention.

Referring to FIG. 11, there is shown a control in accordance with another embodiment of the present invention in the form of flow chart. In the normal slip control, the controller 60 executes steps P31, P32, P33 and P34 in which the throttle opening, engine speed and turbine speed are detected, then the change rate $(d\Theta/dt)$ of the throttle opening $\Theta$ is calculated and the feedback control of FIG. 6 is carried out in step P34 since the flag F1 is zero.

When the driver wants an abrupt acceleration to increase the throttle opening $\Theta$ with the change rate $(d\Theta/dt)$ beyond the predetermined value $\Theta_1$, the controller 60 executes the steps P35, P36, and P37 with, setting flags F1 and F2 at 1 and resetting the timer count value T. In step P38, the controller 60 executes the feedforward control in which the duty ratio D of the second solenoid valve 53 is fixed to zero. Thus, the lock-up clutch 36 is released to establish the converter condition of the torque converter 30 so that an strong or abrupt accelerating condition of the vehicle can be obtained as requested by the driver.

Figure 12:
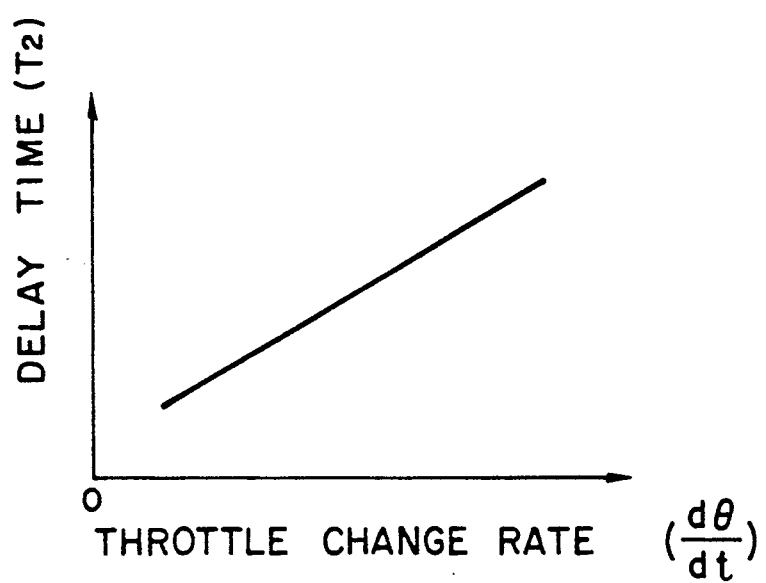
FIG. 12 is a graphical representation showing a property of a delay time to the change rate in the throttle opening.

When the abrupt acceleration is terminated to decrease the change rate $(d\Theta/dt)$ of the throttle opening $\Theta$ below the predetermined value $\Theta_1$, the controller 60 executes steps P32, P33 and thereafter F40 since both the flags F1 and F2 have the value of 1 so that a delay time $T_2$ is set, based on a map as shown in FIG. 12. As seen from FIG. 12, the delay time $T_2$ is increased as the change rate $(d\Theta/dt)$ is increased at the time of the termination of the abrupt acceleration. In step P41, the delay flag F2 is reset at zero and the timer count value T is increased by 1. Thereafter, the feedforward control in terms of step P38 is continued until the value T exceeds the predetermined value $T_2$. Thus, as shown by a line H in FIG. 9, the transfer from the feedforward to the feedback control is delayed by the delay time period $T_2$ after the abrupt acceleration. In this period, the duty ratio D of the second duty solenoid valve 53 is maintained at zero to keep the converter condition. The delay time $T_2$ is so determined with to be increased as the change rate $(d\Theta/dt)$ at the end of the abrupt acceleration. Therefore, a slight acceleration can be obtained in accordance with the driver's request after the abrupt acceleration. On the other hand, when there is no need for the slight acceleration after the abrupt acceleration, the torque converter 30 recovers the slip condition quickly to reduce the fuel consumption.

Hereinafter, there is described still another embodiment, making reference to FIG. 13.

The controller 60 detects the throttle opening $\Theta$, engine speed and turbine speed in step P51. The controller 60 executes the normal feedback control in accordance with the proceedings shown in FIG. 6 in step P55 after the prosecution of steps P51, P52, P53 and P54 since the flag F1 is zero at this moment. When the change rate $(d\Theta/dt)$ is increased beyond the predetermined value $\Theta_1$, the controller 60 executes the step P52 and then steps P56 and P57 in which flags F1 and F3 are set at 1. Thereafter, the controller 60 executes the feedforward control in step P58 in which the duty ratio D is fixed at zero to establish the converter condition of the torque converter 30 for abrupt acceleration as needed.

When the abrupt acceleration is terminated to reduce the change rate $(d\Theta/dt)$ below the predetermined value $\Theta_1$, the controller 60 judges whether or not the change rate $(d\Theta/dt)$ is positive. When the change rate $(d\Theta/dt)$ is negative or when the throttle opening is reduced, the controller 60 executes the steps P54 and P55 to resume the slip, control in terms of the feedback control promptly.

Conversely, when the change rate $(d\Theta/dt)$ is positive, in other words, when the driver wants a slight acceleration or a constant engine speed condition, the controller 60 judges a value of the flag F3 in step P60. Next, the controller 60 executes step P61 to provide a target engine speed $N_{EO}$ with the current engine speed $N_E$, since the flag F3 takes a value 1 just after the abrupt acceleration of the vehicle. The controller 60 executes a feedback control for the target engine speed $N_{EO}$ in accordance with the proceedings following step P63 after resetting the flag F3 at zero in step P62. In proceeding with the feedback control in terms of the engine speed, the controller 60 computes a difference $\Delta N_E = N_E - N_{EO}$ in step P63 and judges the value of the difference $\Delta N_E$ as to whether or not the difference $\Delta N_E$ is positive. When the difference $\Delta N_E$ is positive, the controller 60 adds the compensating value $\Delta D$ to the duty ratio D of the second solenoid valve 53 in step P65. When the difference $\Delta N_E$ is negative, the controller 60 deducts the compensating value $\Delta D$ from the duty ratio D in step P66. In step P67, the controller 60 produces the control signal $S_7$ in accordance with the compensated duty ratio D for operating the second solenoid valve 53. Accordingly, when the engine speed is increased after the abrupt acceleration is over in the case where the change rate $(d\Theta/dt)$ is positive at the end of the abrupt acceleration, the engaging force of the lock-up clutch 36 is increased to suppress raising of the engine speed. To the contrary, when the engine speed is decreased after the abrupt acceleration is over, the engaging force of the lock-up clutch 36 is reduced to raise the engine speed. Thus, the engine speed is prevented from fluctuating after the abrupt acceleration. Specifically, according to the above control, depression of the engine speed can be surely prevented after the abrupt acceleration. Thus, the present invention prevent the driver from having an unexpected feeling throughout accelerating Operation. The proceeding in step P65 may be omitted as needed, since the engine speed does not fall off on terminating the abrupt acceleration.

It will be apparent that various modifications and improvement can be made, based on the above description by those skilled in the art, without departing from the spirit of the present invention. All of such modifications are intended to be included in the scope of the claims which follow.

What is claimed is:

1. A slip control system for a lock-up clutch of an automatic transmission comprising:
    a torque converter having an input member connected to an engine output shaft so that engine output torque is transmitted, and an output member driven by virtue of a rotation of the input member through a hydraulic fluid,
    a hydraulic fluid circuit for controlling an engaging force of the lock-up clutch to carry out a slip control so that an amount of slippage in the lock-up clutch is controlled to a target value corresponding to a target speed difference between the input and output members,
    an acceleration detecting sensor for detecting an accelerating condition of a vehicle and producing a first output signal,
    an engine speed sensor for detecting rotation speed of said engine output shaft and producing a second output signal,
    a turbine speed sensor for detecting rotation speed of said output member and producing a third output signal, and
    a controller for (1) determining if there is a request for abrupt acceleration, based on the first output signal, (2) determining if the vehicle is in a normal operation condition when there is no request for abrupt acceleration, (3) performing a feedback control, by calculating a difference between the amount of slippage in the lock-up clutch and the target value, based on said second and third output signals, calculating a modification coefficient, based on said difference, obtaining a compensating value based on said modification coefficient, increasing said engaging force, based on said compensating value, to reduce the amount of slippage when said difference is greater than the target value, and decreasing said engaging force, based on said compensating value, to increase the amount of slippage when said difference is less than the target value, when the vehicle is in the normal operating condition, and (4) performing a feedforward control, by reducing said engaging force sufficiently to release the lock-up clutch entirely, when there is a request for abrupt acceleration.

2. A slip control system as recited in claim 1, wherein the compensating value is changed for a predetermined period after an accelerating condition of the vehicle is detected.

3. A slip control system as recited in claim 2, wherein the acceleration detecting sensor detects the opening of the throttle valve, the compensating value being decreased by said controller as a change rate of the opening is increased.

4. A slip control system as recited in claim 1, wherein the controller suppresses responsiveness of the hydraulic circuit as the opening of the throttle valve is increased.

5. A slip control system as recited in claim 4, wherein the controller suppresses the responsiveness for a predetermined period after the acceleration detecting sensor detects an end of the accelerating condition of the vehicle.

* * * * *